United States Patent
Belknap et al.

(10) Patent No.: US 6,454,169 B1
(45) Date of Patent: Sep. 24, 2002

(54) METHODS AND APPARATUS FOR OBTAINING AND MAINTAINING POSITION INFORMATION FOR A ROTATING OPTICAL ELEMENT IN A BAR CODE SCANNER

(75) Inventors: William Martin Belknap, Lawrenceville, GA (US); John Baird Keys, Duluth, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/878,705

(22) Filed: Jun. 11, 2001

(51) Int. Cl.[7] .............................................. G06K 7/10
(52) U.S. Cl. .............................. 235/462.4; 235/462.38; 359/216
(58) Field of Search ..................... 235/462.32, 462.38, 235/462.39, 462.4; 359/216, 217

(56) References Cited

U.S. PATENT DOCUMENTS

| | | | |
|---|---|---|---|
| 3,728,677 A | 4/1973 | Munson | 340/146.3 F |
| 4,318,582 A | * 3/1982 | Minoura et al. | |
| 4,726,640 A | 2/1988 | Iwama et al. | 350/6.8 |
| 4,836,631 A | 6/1989 | Shimazu et al. | 350/6.8 |
| 4,847,492 A | * 7/1989 | Houki | 359/217 |
| 4,971,410 A | * 11/1990 | Wike, Jr. et al. | 359/17 |
| 5,069,515 A | 12/1991 | Itami et al. | 359/200 |
| 5,363,231 A | 11/1994 | Komori | 359/219 |
| 5,430,570 A | 7/1995 | Takahashi | 359/216 |
| 5,818,507 A | 10/1998 | Genovese | 347/261 |
| 5,969,844 A | 10/1999 | Itami et al. | 359/200 |
| 6,118,568 A | 9/2000 | Fukasawa et al. | 359/198 |
| 6,347,741 B1 | * 2/2002 | Blanford et al. | 235/462.02 |

FOREIGN PATENT DOCUMENTS

JP 403135738 * 6/1991 .................. 359/217

* cited by examiner

Primary Examiner—Mark Tremblay
(74) Attorney, Agent, or Firm—Priest & Goldstein, PLLC

(57) ABSTRACT

Techniques for determining a position for a rotating optical element, or spinner, of a bar code scanner are described. A diffractive element is positioned so as to be struck by a laser beam produced by a laser source and reflected from the spinner when the spinner is in a reference position. The diffractive element diffracts the reflected beam to produce a diffracted line which strikes a reference position photodetector, thereby causing the reference position photodetector to produce a reference position photosignal. The reference position photosignal can be read by a controller to determine when the spinner is in the reference position, and the position of a Hall sensor can be read at the same time in order to calibrate the reading of the Hall sensor with the reference position. Thereafter, the reading of the Hall sensor can be used to provide accurate position information for the sensor and the position information can be used to control activation and deactivation of the laser source when the spinner is in appropriate positions to produce a desired scan pattern.

12 Claims, 6 Drawing Sheets

FIG. 1A
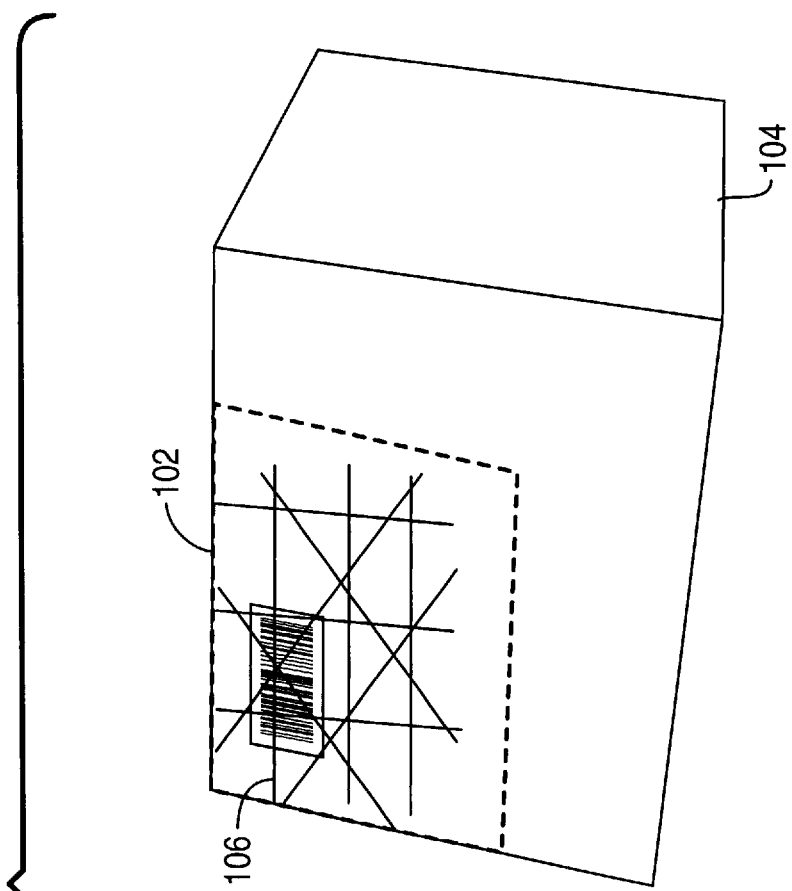
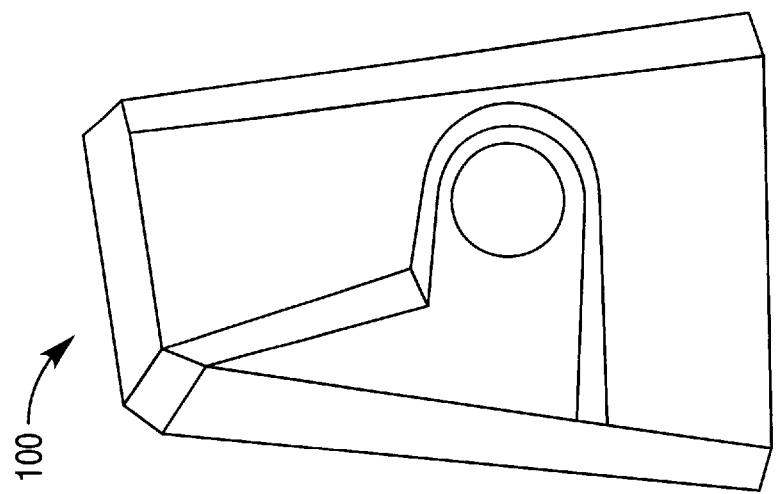

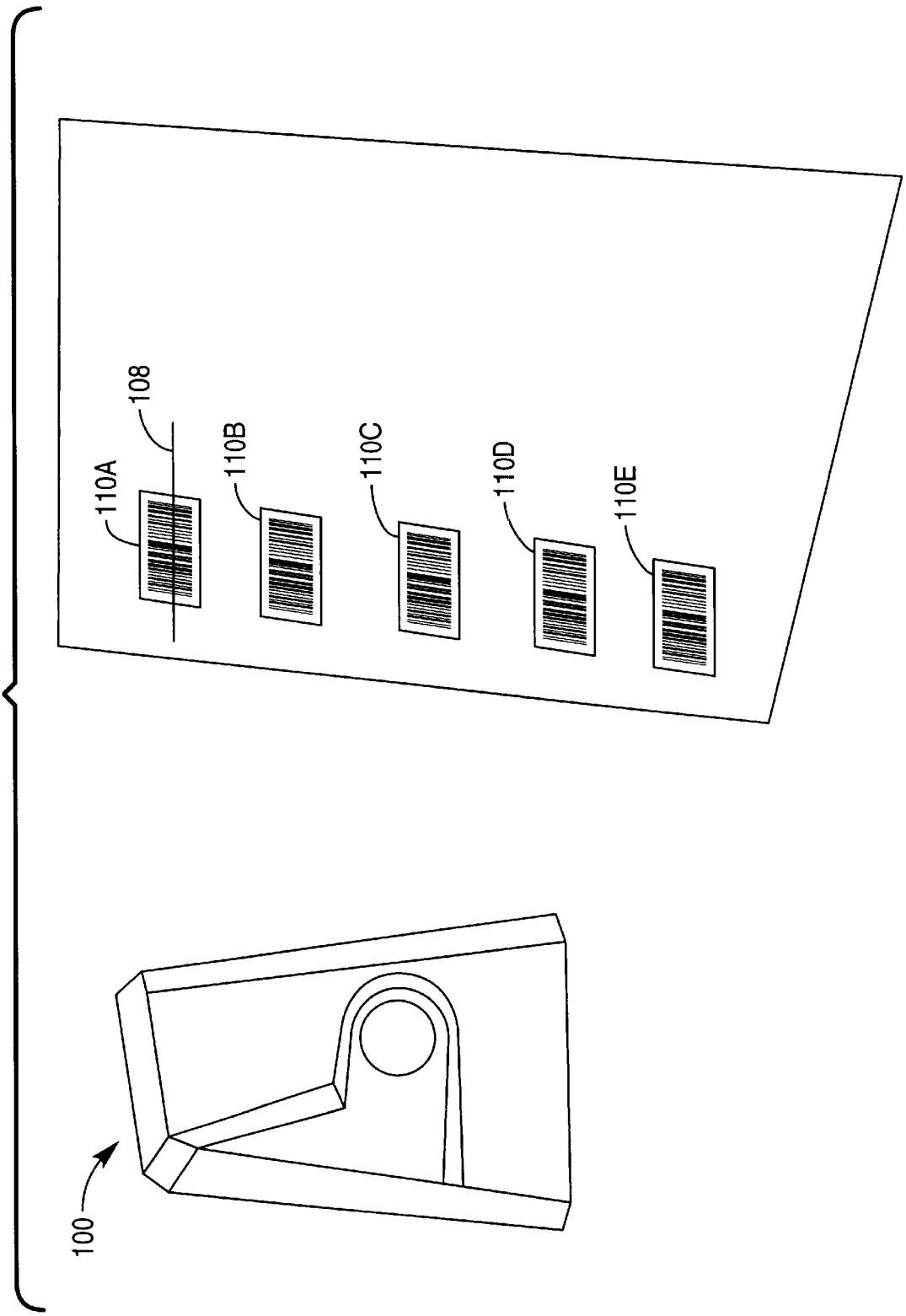

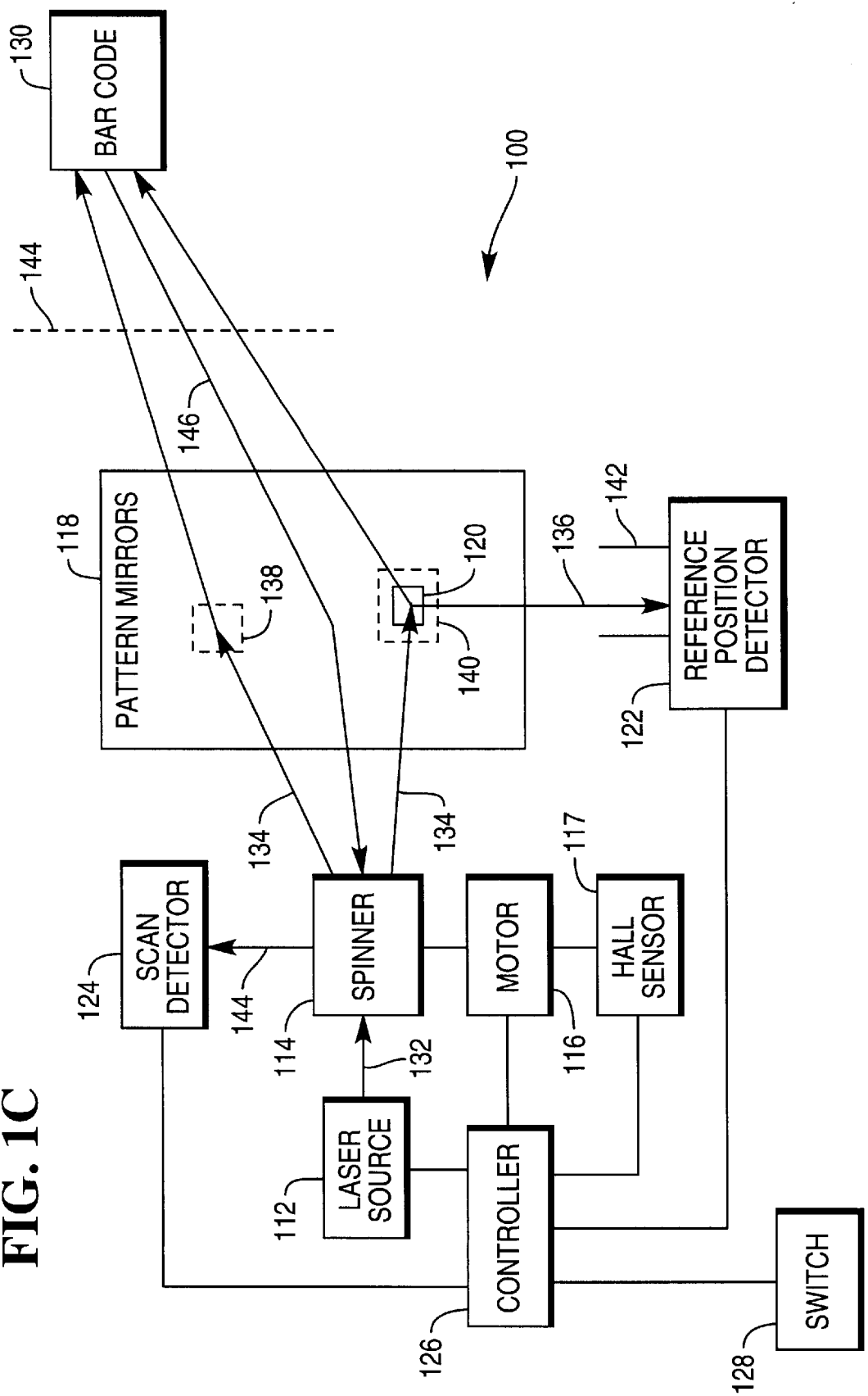

METHODS AND APPARATUS FOR OBTAINING AND MAINTAINING POSITION INFORMATION FOR A ROTATING OPTICAL ELEMENT IN A BAR CODE SCANNER

FIELD OF THE INVENTION

The present invention relates generally to improved bar code scanning and processing. More particularly, the invention relates to methods and apparatus for achieving a highly precise determination of the position of a rotating optical element, or spinner, of a scanner, in order to provide a reference position for the spinner, and then using a sensor to determine the relative position of the spinner with respect to the reference position, in order to maintain a highly precise determination of the absolute position of the spinner at any desired point in the rotation of the spinner.

BACKGROUND OF THE INVENTION

Bar code scanners are used in a wide variety of applications and provide a fast and convenient way to collect data. Bar code scanners typically operate in one of at least two modes. A scanner may operate in an omnidirectional or multiline scan mode, producing a multiline scan pattern in which an array of scan lines is used to illuminate a bar code. Alternatively, a scanner may operate in a single line mode, producing a single scan line which is used to illuminate a bar code. A scanner may suitably be designed to operate exclusively in a single line or multiline mode, or may alternatively be designed so that the desired mode can be selected. Operation of a scanner in a single line mode provides the advantage of allowing an operator to aim the scan line more precisely, in order to avoid inadvertently scanning bar codes which may be located near the bar code which it is desired to scan.

In order to produce a scan pattern, a scanner may direct a laser beam from a laser source to a mirrored polygonal spinner which is rotated by an electric motor. The sides of the polygonal spinner may be referred to as facets. The spinner directs light to one or more of a set of pattern mirrors in order to produce a scan pattern which is directed to and emerges from an aperture. It is possible to design a scanner which produces only an omnidirectional scan pattern. In a scanner having such a design, the laser source may simply be turned on continuously as the spinner rotates. The laser beam is sequentially directed by the spinner over the entire set of pattern mirrors, which reflect the laser beam to produce lines making up the scan pattern. Alternatively, it is possible to design a scanner which produces only a single line scan pattern. In such a scanner, the pattern mirror and other optical components of the scanner may be arranged and configured so that the laser source may remain activated at all times, while the laser beam is reflected out of the scanner so as to form a single line scan pattern.

In order to provide greater flexibility in operation, it may be desirable to design a scanner which can operated in an omnidirectional or a single line scan mode, depending on a user selection or other criteria. In designing such a scanner, it is desirable to use a single set of pattern mirrors to minimize the cost and complexity of the scanner. The pattern mirrors and other internal optics are designed in such a way that a multiline scan pattern will be produced if the laser beam remains activated at all times during the rotation of the spinner, and that a single line scan pattern will be produced if the laser beam is activated and deactivated when the spinner is in appropriate positions. Typically, the laser source is activated when the spinner is oriented such that the laser beam is reflected by the spinner so as to be directed to an initial position and remains activated while the spinner turns so that the reflected laser beam is swept from the initial position to a terminal position. The laser source is deactivated when the reflected laser beam reaches the terminal position, and remains deactivated while the spinner turns, until the spinner is once again in a position to direct the reflected laser beam to the initial position.

In order to produce a single line scan pattern, it is important to turn the laser source on and off when the spinner is at the correct positions. Because the speed of the spinner is typically constant once the spinner has achieved operating speed, the relative position of the spinner can be known once the spinner has achieved operating speed. For example, it is possible to know when the spinner has turned through 20 degrees from a reference position. However, in order to know the actual position of the spinner at a particular time, it is necessary to establish an accurate initial position for the spinner at some point after the spinner has achieved operating speed. Establishing an initial position using a sensing device such as, for example, a Hall sensor, is difficult because variations from motor to motor make it difficult to adapt a sensor to determine the position of the specific motor used, and because additional difficulties are introduced by the acceleration period while the spinner is started and brought to operating speed. There exists, therefore, a need for a highly accurate way to identify when a spinner is at a reference position. In many applications it will be desirable for a scanner to provide a user with the flexibility to choose among a number of different scan patterns. For example, it may be desirable to provide a choice between horizontal, vertical or diagonal single line scan patterns, or to allow user or automatic selection of wider or narrower single line scan patterns. In order to provide such flexibility, it is necessary to be able to turn the laser source on and off at selected points during the rotation of the spinner, in order to trace the laser beam appropriately across one or more of the pattern mirrors. In order to accomplish this, it is highly desirable to maintain an accurate determination of the position of the spinner throughout its rotation.

There exists, therefore, a need for a way to maintain a highly accurate determination of a spinner position as the spinner rotates, in order to determine when to activate and deactivate a laser beam in order to produce single line and other desired scan patterns.

SUMMARY OF THE INVENTION

The present invention determines the position of a spinner using highly accurate means and maintains a highly accurate determination of the spinner position as the spinner continues to rotate during scanner operation. This determination of the spinner position may then be used to determine when to turn a laser source on and off to produce a desired scan pattern. It will be recognized that a scan pattern produced by a scanner appears as a static pattern, but is in reality the result of the extremely rapid tracing of one or more rays of light emerging from the scanner. A single line scan pattern is the result of the repeated tracing of a ray of light across a single line, and an omnidirectional or multiline scan pattern is typically the repeated sequential tracing of a ray of light over a sequence of single lines.

In order to provide accurate spinner position information to produce desired scan patterns, the present invention employs optical techniques to determine a reference position of the spinner. That is, optical techniques are used to determine when the spinner is at a predefined, known position. U.S. application No. 09/878,462, filed on even date herewith, assigned to the assignee of the present invention and incorporated herein by reference in its entirety, describes exemplary optical techniques and describes the use of optical sensing in order to trigger the deactivation of a laser source producing a laser beam once the spinner is in a position so as to reflect the laser beam to the terminal position of a scan pattern. The aforementioned application further describes the use of timing information based on a known speed of the spinner in order to determine the proper time to activate the laser beam so that the laser beam will be properly directed to the initial position of the scan pattern. The optical techniques described in the above referenced application are used in a scanner according the present invention to identify when the spinner is in a reference position. Once the spinner is identified as being in a reference position, the reference position is noted and used to provide an initial position for a sensor such as a Hall sensor. The sensor is preferably able to provide a highly accurate relative position, and this relative position, combined with the knowledge of the reference position which is provided through the optical techniques, is used to provide information identifying the position of the spinner at any time desired.

In order to identify the reference position of the spinner, an optical element, for example, a diffraction grating, is built into the pattern mirror, suitably at the desired terminal position of the laser beam. When the laser beam strikes the diffraction grating, the laser beam is diffracted to produce a diffracted line. The diffracted line strikes a reference position detector, which produces a reference position signal. The reference position signal is supplied to a controller. When the controller receives the reference position signal, the controller detects that the spinner is in the reference position. Once the controller determines that the spinner is in a reference position, a reading is taken from a sensor, such as a Hall sensor, connected to the motor. The reading of the sensor is thereby correlated with the reference position of the spinner. Once this is done, the sensor reading can be used to identify the position of the spinner, because the sensor is capable of providing a very accurate relative position and because the sensor reading representing the reference position is known. The controller can then advantageously use the position of the spinner to determine when to turn the laser source on or off in order to generate a desired scan pattern or to trigger or terminate a scan or other event when the spinner reaches the required position or positions. Each scan line may suitably be created by the repeated tracing of the laser beam across one of the pattern mirrors by one of the facets of the spinner. Because the position of the spinner at all points during its rotation can be accurately known, it is possible to activate and deactivate the laser beam to produce an omnidirectional scan pattern in which the laser beam is traced across each of the pattern mirrors, a single line scan pattern consisting of any single chosen line of the omnidirectional scan pattern, or a multiline scan pattern comprising a plurality of lines of the omnidirectional scan pattern but fewer than all the lines of the omnidirectional scan pattern.

A more complete understanding of the present invention, as well as further features and advantages of the invention, will be apparent from the following Detailed Description and the accompanying drawings.

BRIEF DESCRIPTION OF THE DRAWINGS

FIG. 1A illustrates a scanner according to the present invention, producing a multiline scan pattern;

FIG. 1B illustrates another view of a scanner according to the present invention, producing a single line scan pattern;

FIG. 1C illustrates functional details of a scanner according to the present invention;

DETAILED DESCRIPTION

Figure 2:
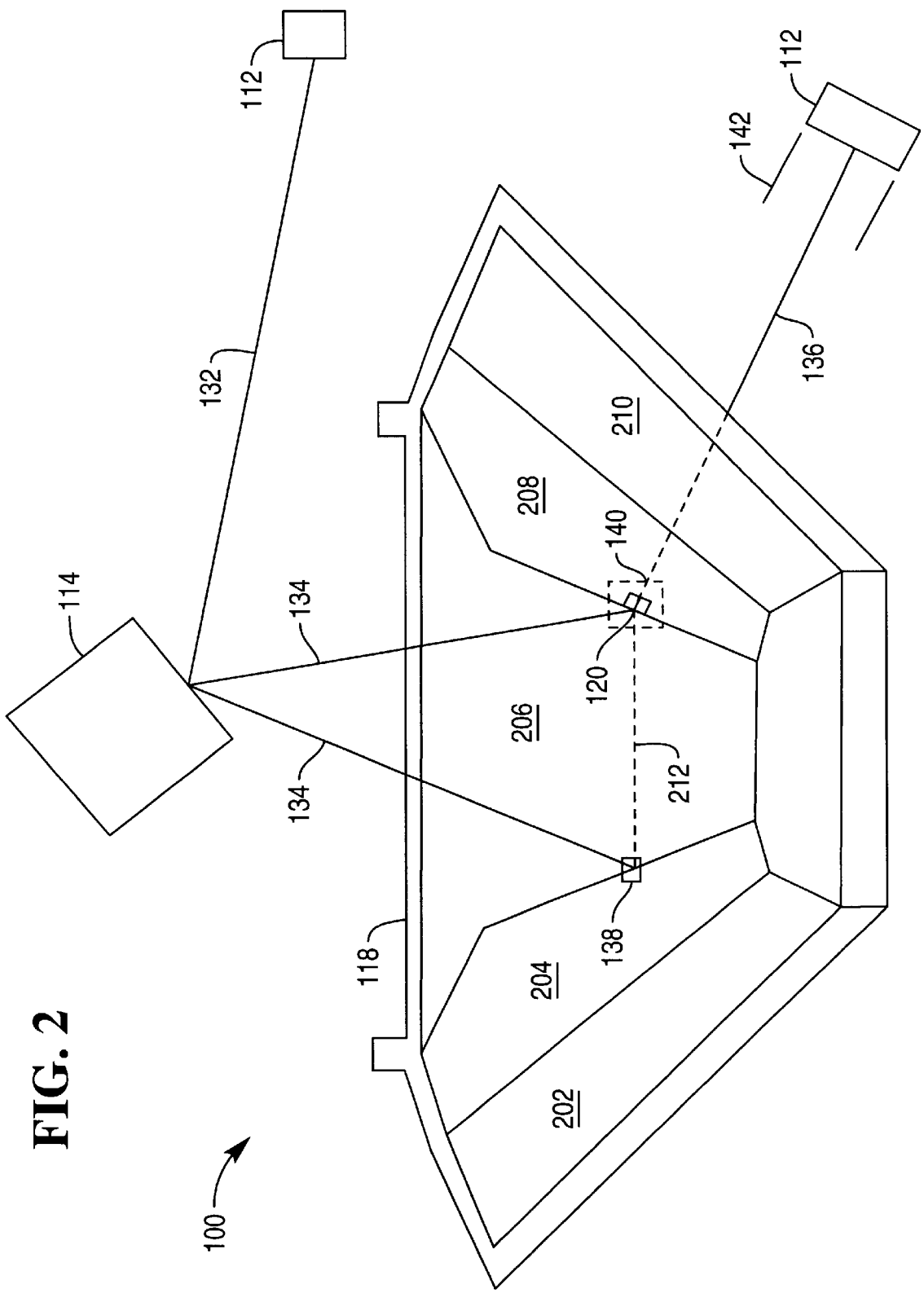
FIG. 2 illustrates a pattern mirror having a diffractive element according to the present invention.

FIG. 1A illustrates a scanner 100 according to an aspect of the present invention. The scanner 100 is shown here as generating a multiline scan pattern 102. The scan pattern 102 is directed at a product 104 bearing a single bar code 106. The scan pattern 102 strikes the bar code 106 and extends beyond the bar code 106. The multiple lines of the scan pattern 102 illuminate the bar code 106 in multiple directions and provide more information than would a single line scan pattern. Because no other bar codes are present in the vicinity of the bar code 106, the fact that the scan pattern 102 extends past the bar code 106 does not present a risk of reading a bar code which is not intended to be read and thereby causing an erroneous result.

FIG. 1B illustrates the scanner 100 generating a single line scan pattern 108, directed at a sheet of paper bearing a plurality of bar codes 110A–110E. The single line scan pattern 108 strikes the bar code 110A and extends in only one dimension. The fact that the scan pattern 108 extends in only one dimension allows it to be directed so as to illuminate the bar code 110A without excessive risk that one of the bar codes 110B–110E will be illuminated in addition to or instead of the bar code 110A, thereby causing an erroneous result.

FIG. 1C illustrates functional components of a scanner 100 according to the present invention. The scanner 100 includes a laser source 112, a spinner 114, a motor 116, a relative position sensor such as a Hall sensor 117 connected to the motor 116, and a set of pattern mirrors 118. The set of pattern mirrors 118 includes a diffractive element 120, which is better seen in FIG. 2. The scanner 100 also includes a reference position detector 122 and a scan detector 124, as well as a controller 126 for controlling the motor 116 and the laser source 112 and for recognizing and processing signals provided by the reference position detector 122 and the scan detector 124. The scanner 100 also includes a user interface such as a switch 128 to allow a user to activate and deactivate the scanner 100 and to select the scan pattern produced by the scanner 100. In the embodiment illustrated here, the user selects a deactivated mode, a multiline scan pattern, a single line scan or one of a number of alternative possible scan patterns by moving the switch 128 to an appropriate position. In a typical operation, the multiline scan pattern does not require knowledge of the position of the spinner 114, but the single line scan pattern and many other alternative scan patterns require precise knowledge of the position of the spinner. This knowledge is provided by using the reference position detector 122 to establish when the spinner is in a reference position and calibrating a reading of the Hall sensor 117 with the spinner reference position.

When an operator moves the switch 128 from the inactive position and sets the switch 128 to produce an omnidirectional scan, the controller 126 senses the position of the switch 128 and activates the laser source 112. The laser source 112 produces a laser beam 132 which is reflected from the spinner 114 to produce a reflected beam 134. The reflected beam 134 sweeps across the pattern mirrors 118 and is directed by the pattern mirrors 118 to produce a scan pattern which emerges from the aperture 144. Whenever the spinner 114 reaches a reference position, the spinner 114 reflects the laser beam 132 such that the reflected beam 134 strikes the diffractive element 120. The diffractive element 120 produces a diffracted line 136 orthogonal to the scan direction. The diffractive element 120 is preferably positioned such that there is no line of sight direction from the diffractive element 120 to the scan detector 124, in order to minimize false scans or other undesired effects which might otherwise be caused from scattered light produced by the diffractive element 120. The diffracted line 136 strikes the reference position detector 122 and the reference position detector 122 sends a reference position photosignal to the controller 126. However, when the scanner 100 is set to an omnidirectional mode, the controller 126 may suitably ignore the reference position photosignal. The scan detector 124, however, produces a photosignal whenever the scan pattern strikes a bar code such as the bar code 130, producing reflected light 146 which enters the scanner, is directed by the pattern mirrors 118 to the spinner 114 and is then directed by the spinner 114 onto the scan detector 124, allowing the controller 126 to detect and process bar codes illuminated by the scan pattern.

When the operator moves the switch 128 so as to produce a single line scan pattern or another scan pattern which requires an accurate determination of the position of the spinner 114, the controller 126 detects and processes reference position photosignals produced by the reference position detector 122. In order to produce a single line scan pattern, the laser source 112 is activated during a portion of the rotation of the spinner 114 and then deactivated. As illustrated here, the laser source 112 is activated when the spinner 114 is in a position such that a reflected beam 134 is in an initial position 138 and deactivated when the spinner 114 reaches a position such that the reflected beam is in a terminal position 140. The terminal position 140 here coincides with the diffractive element 120.

When the reflected beam 134 strikes the diffractive element 120, the diffracted line 136 is produced and strikes the reference position detector 122. The reference position detector 122 produces a reference position photosignal which is furnished to the controller 126. In order to prevent false signals, the reference position detector 122 preferably possesses a baffling aperture 142 to prevent the reference position detector 122 from being struck by light from sources other than the diffracted beam 136. The controller 126 detects the reference position photosignal and deactivates the laser source 112. The controller 126 also reads the Hall sensor 117 and associates the reading of the Hall sensor with the reference position. The controller 126 is then able to compute the position of the spinner 114 by computing the displacement of the spinner 114 from the reference position. For example, if a single line scan pattern has been selected, whenever the spinner 114 reaches the correct position so that the reflected beam 134 will be in the initial position 138, the controller 126 activates the laser source 112. When the reflected beam 134 reaches the terminal position 140, the controller 126 deactivates the laser source 112 and waits until the spinner 114 reaches the correct position for activation of the laser source 112. Once the reference position of the spinner 114 has first been detected, the controller 126 detects the position of the spinner 114 by reading the Hall sensor 117. When the spinner 114 reaches the reference position on subsequent revolutions, this fact can be recognized by noting that the Hall sensor gives the same reading as was detected when the spinner was first identified as being in the reference position. However, it will be recognized that the controller 126 may be designed or programmed to detect the reference position by reading the reference position photosignal at each rotation of the spinner 114. Alternatively, the controller 126 may read the reference position photosignal periodically but less frequently than on every rotation of the spinner 114, in order to verify that the Hall sensor 117 is continuing to provide correct position readings or to recalibrate the Hall sensor readings with the reference position of the spinner 114 if needed.

As an alternative to using the Hall sensor 117 to provide spinner position information, it is also possible to use timing information to control the activation and deactivation of the laser source 112. Once the spinner 114 has achieved operating speed, the speed of the spinner 114 typically does not vary. The Hall sensor 117 can detect when the spinner 114 has achieved operating speed and once the spinner 114 has achieved operating speed, the initial position of the spinner 114 can be established by detecting the reference position photosignal. Thereafter, the position of the spinner 114 may be computed by using the speed of the spinner 114 and the time elapsed since the reference position photosignal was detected. Timing information typically provides sufficient accuracy to control the laser source 112 in order to produce a single line scan so long as the speed of the spinner 114 remains within a predetermined tolerance. If the speed of the spinner 114 varies excessively, the Hall sensor 117 can detect the variation. The speed of the spinner 114 is likely to vary if the scanner 100 is moved or jolted, for example when the scanner is picked up. If the Hall sensor 117 detects an excessive variation and then a return to the previous speed, the controller 126 can recalibrate the position of the spinner upon receiving the reference position photosignal. The position of the spinner 114 can then be computed using timing information. Alternatively, position information for the spinner 114 can be maintained by reading the Hall sensor, with the controller 126 using the position as determined by the Hall sensor to control the laser source 112 as needed.

FIG. 2. illustrates relevant elements of the interior of the scanner 100. The laser source 112, the spinner 114 and the set of pattern mirrors 118 are illustrated here. The set of pattern mirrors 118 may suitably be molded as a single unit and the exemplary set of pattern mirrors 118 illustrated here includes first through fifth pattern mirrors 202–210. The set of pattern mirrors 118 includes the diffractive element 120, which may suitably be a diffraction grating. The diffractive element 120 is shown here as positioned on an intersection between the mirrors 206 and 208. Placing the diffractive element 120 at an intersection between mirrors helps to prevent interference with the generation of a scan pattern. The diffractive element 120 is preferably small. An exemplary set of dimensions suitable for the diffractive element 120 is 2 mm by 1.2 mm. The small size of the diffractive element 120 helps to prevent interference with the generation of a scan pattern. Designing the diffractive element 120 so that it is small, and placing it away from the main reflective portion of the mirrors 202–210 allows the diffractive element to produce a single precisely directed line while minimizing or eliminating the generation of additional scattered light which will interfere with the generation of a desired scan pattern. The spinner 114 is shown here as being in the reference position. The laser source 112 is activated, producing the laser beam 132, which is striking the spinner 114 and being reflected to produce the reflected beam 134.

The reflected beam 134 is shown here as tracing a path 212 across the mirror 206, from the initial position 138 to the terminal position 140. At the terminal position 140, the reflected beam 134 is shown as striking the diffractive element 120 to produce the diffracted beam 136. The diffracted 136 beam is in turn striking the reference position detector 122. The reference position detector is thus able to produce a photosignal which can be read by the controller (not shown in FIG. 2) to establish that the spinner 114 is in the reference position. Also shown here is the baffling aperture 142, which allows the diffracted beam 136 to strike the reference position detector, but prevents other light, such as scattered light from a reflected scan pattern, from striking the reference position detector 122.

Because the Hall sensor 117 (illustrated in FIG. 1C) maintains accurate position information for the spinner 114, it is possible to activate the laser source 112 at any desired position of the spinner. In the example illustrated here, the laser source 112 is activated and deactivated so that the reflected beam 134 moves from the initial position 138 to the terminal position 140, with the terminal position 140 being coincident with the diffraction grating 120. However, once the reference position of the spinner 114 is established, the laser source 112 may be activated and deactivated so as to trace the reflected beam 134 along any path or combination of paths accommodated by the optics of the scanner 100. For example, the reflected beam 134 may move along the mirror 204 or the mirror 210, may alternate between moving along the mirror 204 and the mirror 210, or may move along one or more of the pattern mirrors 202–210 in any of a number of other desired paths. To take another example, in response to a user selection of a longer or shorter single line scan pattern, the path of the reflected beam 134 may be lengthened or shortened. To take a further example, the scanner 100 may be programmed to produce a short single line scan pattern at the beginning of a scan attempt and to automatically lengthen the scan pattern as time passes during the scan attempt.

The scanner 100 may suitably be adapted so that a scan pattern similar to the pattern 102 of FIG. 1A is produced when the laser source 112 is activated continuously during rotation of the spinner 114. By activating and deactivating the laser source 112 at appropriate times, it is possible to create a series of single line scan patterns, each pattern comprising a display of a single line of the scan pattern 102 of FIG. 1A. Such a series of scan patterns is useful for providing the same degree of coverage as would the scan pattern 102, but without occupying the same space as would the scan pattern 102.

Figure 3:
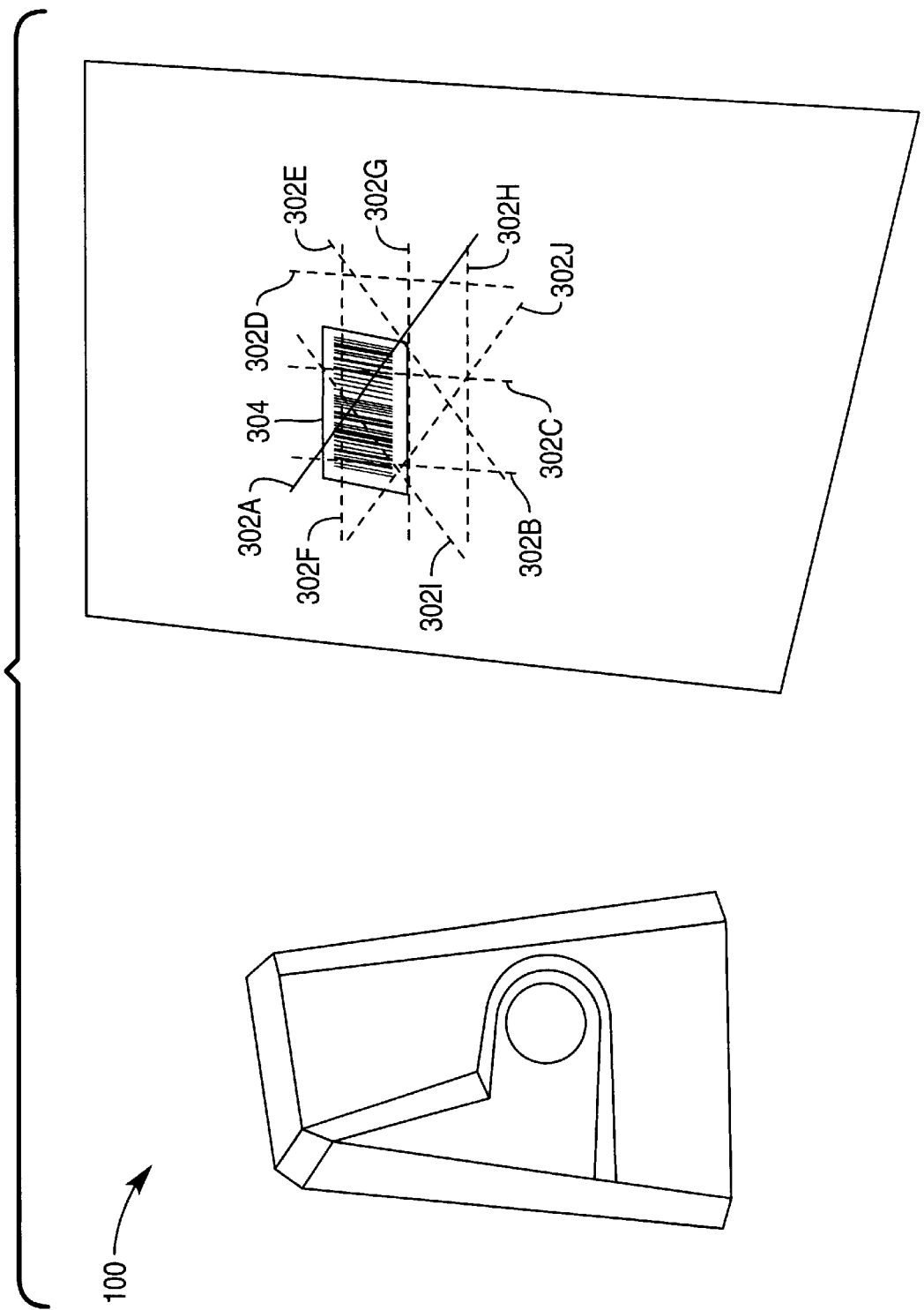
FIG. 3 illustrates scanner producing a sequence of single line scan patterns according to the present invention.

FIG. 3 illustrates a scanner 100 according to the present invention, shown here as generating a sequence of scan lines 302A–302J in order to illuminate a bar code 304. The line 302A is shown as a solid line because it is the line currently being generated. The lines 302B–302J are shown as dashed lines because they represent lines which are not currently being generated but which will be generated individually in sequence, with generation of the current scan line being stopped before generation of the next scan line begins. For example, the scan line 302A is shown as being generated. After the scan line 302A has been generated for a predetermined time, the scan line 302A will cease to be generated and the scan line 302B will be generated. Then the scan line 302B will cease to be generated and the scan line 302C will begin to be generated, and so on. Each scan line is generated by appropriate activation and deactivation of the laser source 112 illustrated in FIGS. 1C and 2. The scan line is generated by activating and deactivating the laser source 112 at the same positions of the spinner 114 through an appropriate number of rotations of the spinner 114. The next scan line is generated by changing the positions of the spinner 114 at which the laser source 112 is to be activated and deactivated, and performing the appropriate activations and deactivations during an appropriate number of spinner rotations.

Figure 4:
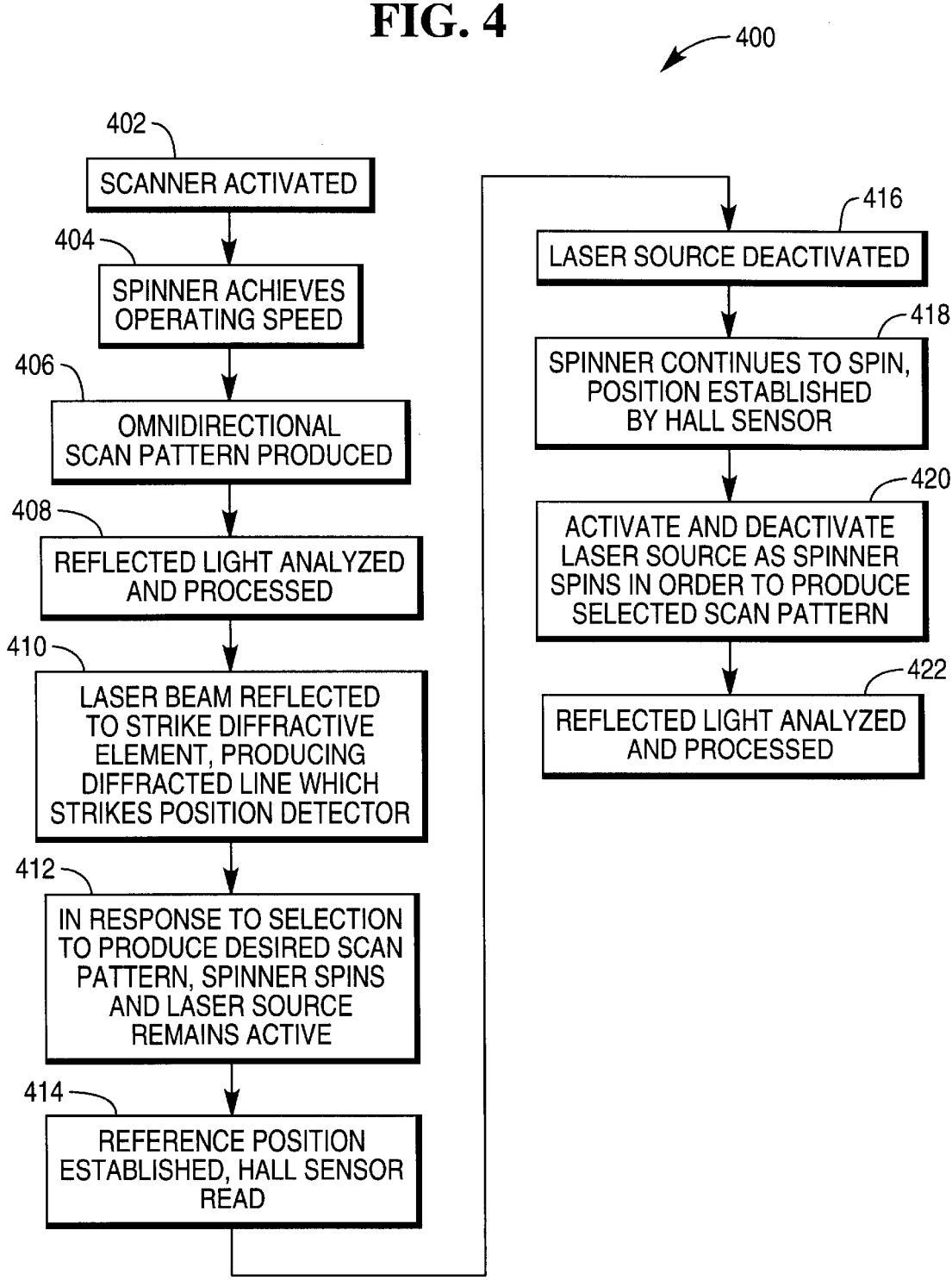
FIG. 4 illustrates a process of scan pattern generation according to the present invention.

FIG. 4 illustrates a process 400 for producing a scan pattern according to the present invention, using a diffractive element for determining a reference position of a spinner and sensor such as a Hall sensor to maintain information about the position of the spinner once the reference position of the spinner has been established, in order to allow for generation of a desired scan pattern. At step 402, a scanner is activated. The scanner may suitably be similar to the scanner 100 of FIGS. 1A–1C and may suitably include a set of pattern mirrors similar to the pattern mirrors 118 of FIGS. 1C and 2 having a diffractive element similar to the diffractive element 120 of FIGS. 1C and 2. At step 404, a spinner within the scanner is detected as having achieved operating speed, suitably by a sensor such as a Hall sensor. At step 406, in response to a user selection to set the scanner to produce an omnidirectional scan pattern, a laser source is activated so that a laser beam strikes the spinner. At step 408, when light enters the scanner and strikes a scan detector within the scanner, the reflected light is analyzed to determine whether it reflects a bar code scan and to identify the bar code. At step 410, when the spinner reaches a reference position, the spinner reflects the laser beam so that the reflected laser beam strikes the diffractive element. The diffractive element diffracts the reflected laser beam to produce a diffracted line which strikes a reference position detector. The reference position detector produces a reference position photosignal, but because the scanner is set to produce an omnidirectional scan pattern, the reference position photosignal may be ignored. However, if it is desired to establish a reference position for later use in controlling the laser source, the controller reads the reference position photosignal to establish that the spinner is in a reference position and simultaneously reads the Hall sensor to calibrate the Hall sensor reading with the reference position.

By obtaining a reference position for the spinner and using a sensor to maintain accurate position information for the spinner, it is possible to control the laser source so as to produce any desired scan pattern which may be accommodated by the optical design of the scanner, such as a single line scan pattern, a multiline scan pattern comprising a subset of the lines which make up the omnidirectional scan pattern, a full or partial sequence of single lines, the single lines comprising the lines making up the omnidirectional scan pattern, or other desired patterns. These scan patterns can be produced by activating or deactivating the laser source when the spinner is in appropriate positions.

At step 412, upon operation of a selection switch by a user in order to set the scanner to produce a desired scan pattern, the spinner continues to spin and the laser source remains active. At step 414, when the spinner achieves a reference position, the diffracted line strikes the position photodetector and a reference position photosignal is produced. If a reference position has not previously been established or if it is desired to recalibrate the reference position, the reference position photosignal is used to establish a reference position for the spinner and the Hall sensor connected to the spinner motor is read to calibrate the Hall sensor reading with the spinner reference position. At step 416, the laser source is deactivated. At step 418, the Hall sensor is read as the spinner continues to spin, in order to establish the position of the spinner. At step 420, the laser source is activated and deactivated as the spinner spins in order to produce the scan pattern selected. The laser source is activated and deactivated based on the position of the spinner, with the position of the spinner being determined by reading of the Hall sensor. At step 422, when light enters the scanner and strikes a scan detector within the scanner, the reflected light is analyzed and processed to determine whether it reflects a bar code scan and to process the reflected light to extract bar code information. Steps 420–422 are repeated so long as the scanner remains set to produce the selected scan pattern.

For purposes of illustration, the steps 400–422 are presented here as occurring sequentially, but it will be recognized that the steps 402–410 for producing and detecting an omnidirectional scan pattern and the steps 412–422 for producing and detecting another selected scan pattern need not occur in the sequence presented here, but that an omnidirectional scan pattern or other selected scan pattern may be produced whenever desired in response to a user's selection of mode.

While the present invention is disclosed in the context of a presently preferred embodiment, it will be recognized that a wide variety of implementations may be employed by persons of ordinary skill in the art consistent with the above discussion and the claims which follow below.

We claim:

1. A scanner comprising:
    a laser source;
    a spinner for reflecting light from the laser source, the spinner being rotated by a motor;
    a set of pattern mirrors for receiving light reflected from the spinner and reflecting the light to produce a scan pattern;
    a diffractive element for receiving light reflected from the spinner when the spinner is in a reference position and refracting the light to produce a diffracted beam;
    a reference position photodetector for receiving the refracted beam and producing a reference position signal indicating that the spinner is in the reference position;
    a relative position sensor for identifying a relative position of the spinner; and
    a controller for receiving the reference position signal when the spinner is in the reference position and reading the relative position sensor to correlate the sensor reading with the reference position of the spinner, the controller being further operative to read the relative position sensor during rotation of the spinner to determine the position of the spinner.

2. The scanner of claim 1 wherein the controller is operative to activate and deactivate the laser source based on the position of the spinner.

3. The scanner of claim 2 wherein the diffractive element is a diffraction grating.

4. The scanner of claim 3 wherein the relative position sensor is a Hall sensor connected to the motor.

5. The scanner of claim 4 and also including a switch for selecting between an omnidirectional scan pattern and a single line scan pattern.

6. The scanner of claim 5 further comprising a baffling aperture in the vicinity of the reference position photodetector, the baffling aperture shielding the reference position photodetector from light other than the diffracted line in order to prevent an incorrect identification of a reference position of the spinner.

7. The scanner of claim 6 wherein the diffractive element is positioned at an edge of one of the set of pattern mirrors and is very small relative to the set of pattern mirrors.

8. The scanner of claim 7 wherein the diffractive element is positioned at an intersection between two pattern mirrors of the set of pattern mirrors.

9. A method of scan pattern generation, comprising:
    activating a laser source within a scanner to generate a laser beam, the laser source being oriented to produce a laser beam directed toward a rotating spinner within the bar code scanner;
    reflecting the laser beam from the spinner to produce a reflected beam;
    when the spinner is in the reference position, directing the reflected beam to a diffractive element to produce a diffracted line and directing the diffracted line to a reference position photodetector to produce a reference position photosignal indicating that the spinner is in the reference position;
    using the reference position photosignal to calibrate a sensor reading with the reference position of the spinner;
    using the sensor reading to determine the position of the spinner during rotation of the spinner; and
    activating and deactivating the laser source when the spinner is in appropriate positions, in order to generate a desired scan pattern.

10. The method of claim 9 wherein the diffractive element is a diffraction grating.

11. The method of claim 10 wherein the relative position sensor is a Hall sensor.

12. A method of determining a position of a rotating spinner within a bar code scanner, comprising:
    activating a laser source within a scanner to generate a laser beam, the laser source being oriented to produce a laser beam directed toward the spinner;
    reflecting the laser beam from the spinner to produce a reflected beam;
    when the spinner is in the reference position, directing the reflected beam to a diffractive element to produce a diffracted line and directing the diffracted line to a reference position photodetector to produce a reference position photosignal indicating that the spinner is in the reference position;
    using the reference position photosignal to calibrate a sensor reading with the reference position of the spinner; and
    using the sensor reading to determine the position of the spinner during rotation of the spinner.

* * * * *